(12) United States Patent
Homme

(10) Patent No.: US 7,777,952 B2
(45) Date of Patent: Aug. 17, 2010

(54) IMAGE STABILIZING APPARATUS, LENS UNIT, AND IMAGE PICKUP APPARATUS

(75) Inventor: Shigeo Homme, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 323 days.

(21) Appl. No.: 11/906,411

(22) Filed: Oct. 1, 2007

(65) Prior Publication Data

US 2008/0080053 A1    Apr. 3, 2008

(30) Foreign Application Priority Data

Oct. 3, 2006    (JP)    ............... 2006-271541

(51) Int. Cl.
G02B 27/64    (2006.01)
(52) U.S. Cl. .............. 359/554; 359/557; 396/52; 396/55
(58) Field of Classification Search ......... 359/554–557, 359/819–830
See application file for complete search history.

(56) References Cited

U.S. PATENT DOCUMENTS 4,780,739 A * 10/1988 Kawakami et al. ............ 396/54
5,305,040 A *  4/1994 Enomoto ..................... 396/55
6,307,678 B2* 10/2001 Kosaka et al. ............... 359/557

FOREIGN PATENT DOCUMENTS

JP    2000-013671    1/2000

* cited by examiner

*Primary Examiner*—Thong Nguyen
(74) *Attorney, Agent, or Firm*—Cohen Pontani Lieberman & Pavane LLP

(57) ABSTRACT

The present invention relates to an image stabilizing apparatus, a lens unit, and an image pickup apparatus. The present invention provides an image stabilizing apparatus for stabilizing an image by moving a predetermined lens group in an image pickup optical system which transmits a light flux from an object. The image stabilizing apparatus includes: a shift mechanism for shifting the predetermined lens group in a predetermined direction; and a rotation mechanism for rotating the shift mechanism in a plane perpendicular to an optical axis of the lens group.

7 Claims, 8 Drawing Sheets

IMAGE STABILIZING APPARATUS, LENS UNIT, AND IMAGE PICKUP APPARATUS

This application is based on Japanese Patent Application No. 2006-271541 filed on Oct. 3, 2006, in Japanese Patent Office, the entire content of which is hereby incorporated by reference.

TECHNICAL FIELD

The present invention relates to an image stabilizing apparatus for moving a lens to stabilize an image during imaging exposure and recording a clear image, a lens unit, and an image pickup apparatus.

BACKGROUND

Conventionally, an active image stabilizing art for correcting a shift of the optical axis due to a shake of an image pickup apparatus and obtaining a clear image is in practical use. As an image stabilizing art, three kinds are known such as a type of moving a part of the image pickup optical system, a type of moving the whole image pickup optical system, and a type of moving the image pickup element.

As an art for moving a part of the image pickup optical system among the aforementioned image stabilizing arts, there is known an image stabilizing apparatus which performs image stabilizing control by changing the cut-off frequency of the high-pass filter process on the basis of the focal distance, in order to apply the art to a zoom lens which can change the focal distance (for example, Patent Document 1: Japanese Patent Application 2000-13671).

Also in the image stabilizing apparatus disclosed in the Patent Document 1, the art of moving a part of the image pickup optical system for image stabilization moves any of the lenses of the lens groups composing the image pickup optical system in the directions perpendicular to each other in the plane perpendicular to the optical axis and performs image stabilization. Concretely, the apparatus is composed of: a first moving mechanism suspending a lens frame holding a lens, for moving the lens frame in a predetermined direction; and a second moving mechanism suspending both the lens frame and first moving mechanism for moving them in the direction perpendicular to the moving direction of the first moving mechanism.

Such a constitution is mechanically complicated and causes an increase in cost, and moreover the second moving mechanism must move integrally with the lens frame and first moving mechanism. It requires large drive force, thus a problem arises that a strong actuator at a high cost is necessary.

SUMMARY

The present invention, with the foregoing in view, is intended to obtain an image stabilizing apparatus at a low cost for driving a lens group by a simple mechanism, a lens unit, and an image pickup apparatus.

An image stabilizing apparatus relating to the present invention is provided for stabilizing an image by moving a predetermined lens group in an image pickup optical system which transmits a light flux from an object. The image stabilizing apparatus includes: a shift mechanism for shifting the predetermined lens group in a predetermined direction; and a rotation mechanism for rotating the shift mechanism in a plane perpendicular to an optical axis of the lens group.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Hereinafter, the present invention will be explained in detail by referring to the embodiment, though the present invention is not limited to it.

The present invention provides an image stabilizing apparatus at a low cost capable of driving a lens group by a simple mechanism, a lens unit, and an image pickup apparatus.

An image stabilizing apparatus relating to the present invention, is provided for stabilizing an image by moving a predetermined lens group in an image pickup optical system which transmits a light flux from an object, in which the image is stabilized by shifting the predetermined lens group in a predetermined direction perpendicular to the optical axis of the predetermined lens group and by rotating the shift direction in a plane perpendicular to the optical axis.

As a preferred embodiment of the image stabilizing apparatus, the image stabilizing apparatus comprises a shift mechanism for shifting the lens group in a predetermined direction; and a rotation mechanism for rotating the shift mechanism in a plane perpendicular to an optical axis of the lens group.

In the above image stabilizing apparatus, an actuator of the shift mechanism may comprise a shape memory alloy whose length changes due to an electricity applied to the actuator.

Alternatively, the actuator may comprise a piezoelectric element whose length changes due to an electricity applied to the actuator.

In the above image stabilizing apparatus, the shift mechanism may shift the lens group in the predetermined direction by rolling the lens group in the plane perpendicular to the optical axis.

A lens unit relating to the present invention comprises the abovementioned image stabilizing apparatus.

An image pickup apparatus relating to the present invention comprises the abovementioned lens unit.

Figure 1:
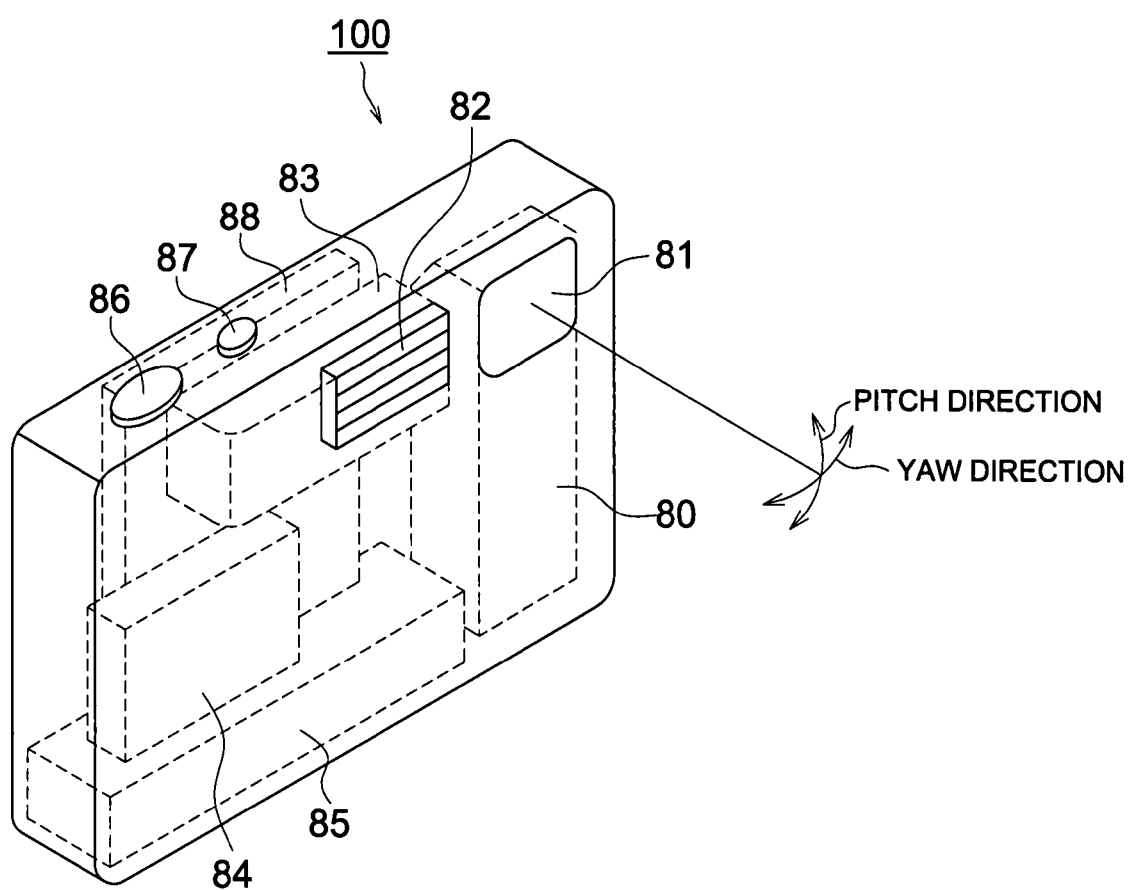
FIG. 1 is a drawing showing an example of the internal arrangement of the major constitution unit of the camera which is an example of the image pickup apparatus having the lens unit relating to this embodiment.

FIG. 1 is a drawing showing an example of the internal arrangement of the major constitution unit of a camera 100 which is an example of the image pickup apparatus including the lens unit relating to this embodiment. FIG. 1 is a perspective view of the camera 100 viewed from the object side.

As shown in FIG. 1, the camera 100 is provided with a lens unit 80 containing a folded image pickup optical system with variable power vertically arranged on the right portion of the camera and with an opening 81 formed so as to take in the light flux from the object. On the opening 81, there is installed a lens barrier, which is not drawn, for switching the open status for exposing the opening 81 and the closed status for covering the opening 81.

The camera 100 is further provided with a flash emission window 82. Behind the flash emission window 82, there is arranged a flash unit 83 including a light reflector, a xenon tube, a main capacitor, and a circuit substrate. In FIG. 1, there are provided an image recording memory 84 of a card type and a battery 85 which supplies power to each unit of the camera. The image recording memory 84 and battery 85 can be mounted or demounted through a cover, which is not drawn.

There is arranged a release button 86 on the top of the camera 100. When the button is pressed to the first stage (may be referred also to as Switch S1), the imaging preparation operation of the camera, that is, the focusing operation and beam measuring operation are performed, and when the button is pressed to the second stage (may be referred also to as Switch S2), the imaging exposure operation is performed. The camera 100 is also provided with a main switch 87 which changes the operation status of the camera and the non-operation status thereof. When the camera is switched to the operation status by the main switch 87, the lens barrier, which is not drawn, is put into the open status and each unit starts operation. Further, when the camera is switched to the non-operation status by the main switch 87, the lens barrier, which is not drawn, is put into the closed status and each unit finishes the operation.

On the rear of the camera, there is arranged a display unit 88 composed of an element such as LCD and an organic EL for displaying an image and character information. There are further arranged operation members on the rear of the camera, which are not drawn, such as a zoom button for performing zoom up and zoom down, a reproduction button for reproducing a picked-up image, a menu button for displaying various menus on the display unit 88, and a selection button for selecting a desired function from the display.

Further, between the above major constitution units, there are arranged circuit substrates which are not drawn. The circuit substrates have various loaded electronic parts for connecting the major constitution units, and drive and control the major constitution units. The camera is further provided with an external I/O terminal, a strap mounting unit, and a tripod seat, which are not drawn.

Figure 2:
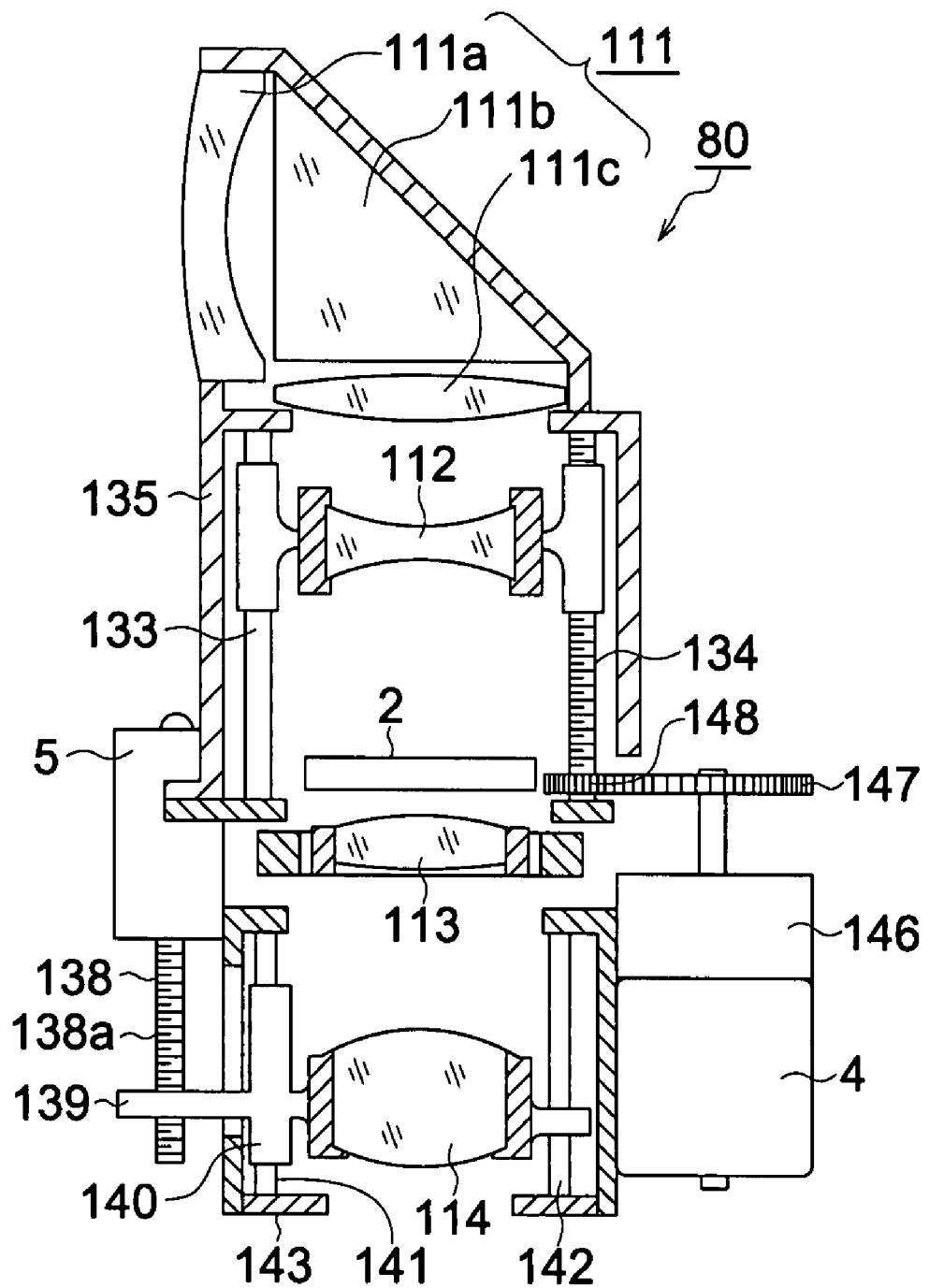
FIG. 2 is a schematic cross sectional view of the lens unit relating to this embodiment.

FIG. 2 is a schematic cross sectional view of the lens unit 80 relating to this embodiment.

The lens unit 80 shown in FIG. 2 contains a zoom lens and is composed of four lenses such as, sequentially from the object side, a stationary first lens group 111, a second lens group 112 for moving on the optical axis to vary power, a third lens group 113 for moving in the plane perpendicular to the optical axis to perform image stabilization, and a fourth lens group 114 for moving on the optical axis to correct image plane variations in correspondence with the power variation and to adjust the focus.

The first lens group 111 is composed of a lens 111a arranged most on the object side, a triangular prism 111b having a reflective surface arranged behind the first lens 111a, and a lens 111c arranged behind the triangular prism 111b and has a function for bend the optical axis by almost 90°.

The third lens group 113 is a lens group for moving in the plane perpendicular to the optical axis and performing image stabilization. There are two actuators and two sensors around the third lens group 113 which shift the third lens group 113 in the direction perpendicular to the optical axis and rotate the shift direction around the optical axis, for performing the image stabilization. Namely, the third lens group 113 is moved by shifting the third lens group 113 in a predetermined direction by the shift mechanism and by rotating the shift mechanism in the plane perpendicular to the optical axis by the rotation mechanism. The structure around the third lens group 113 will be explained later in detail.

As shown in FIG. 2, the lens unit is provided with a guide shaft 133 for stopping rotation of the second lens group 112, a lead screw 134 which is a male screw used for moving the second lens group 112, and a first motor 4 which is composed of, for example, a stepping motor. The lens unit is further provided with a speed reducer unit 146 of the first motor 4, and with interlocking gears 147 and 148 in which the interlocking gear 148 is fixed to the lead screw 134 for moving the second lens group 112.

The lens unit is further provided with a fixed lens barrel 135, a stop shutter unit 2, and a second motor 5 which is composed of, for example, a stepping motor. The lens unit is further provided with an output shaft 138 of the second motor 5. On a part of the output shaft, a male thread 138a for moving the fourth lens group 114 is formed. The lens unit is further provided with a female thread 139 which meshes with the male thread 138a and is united with a moving frame 140 of the fourth lens group 114. The lens unit is further provided with guide shafts 141 and 142 of the moving frame 140 of the fourth lens group 114 and a fixed lens barrel 143 for positioning and holding the guide shafts 141 and 142.

By use of the aforementioned constitution, when the second motor 5 is driven, the fourth lens group 114 moves in the optical axial direction by screwing of the male thread 138a installed on the output shaft 138. Further, when the first motor 4 is driven, the interlocking gears 147 and 148 rotate in link motion with each other, and the lead screw 134 rotates, thus the second lens group 112 moves in the optical axial direction.

Figure 3:
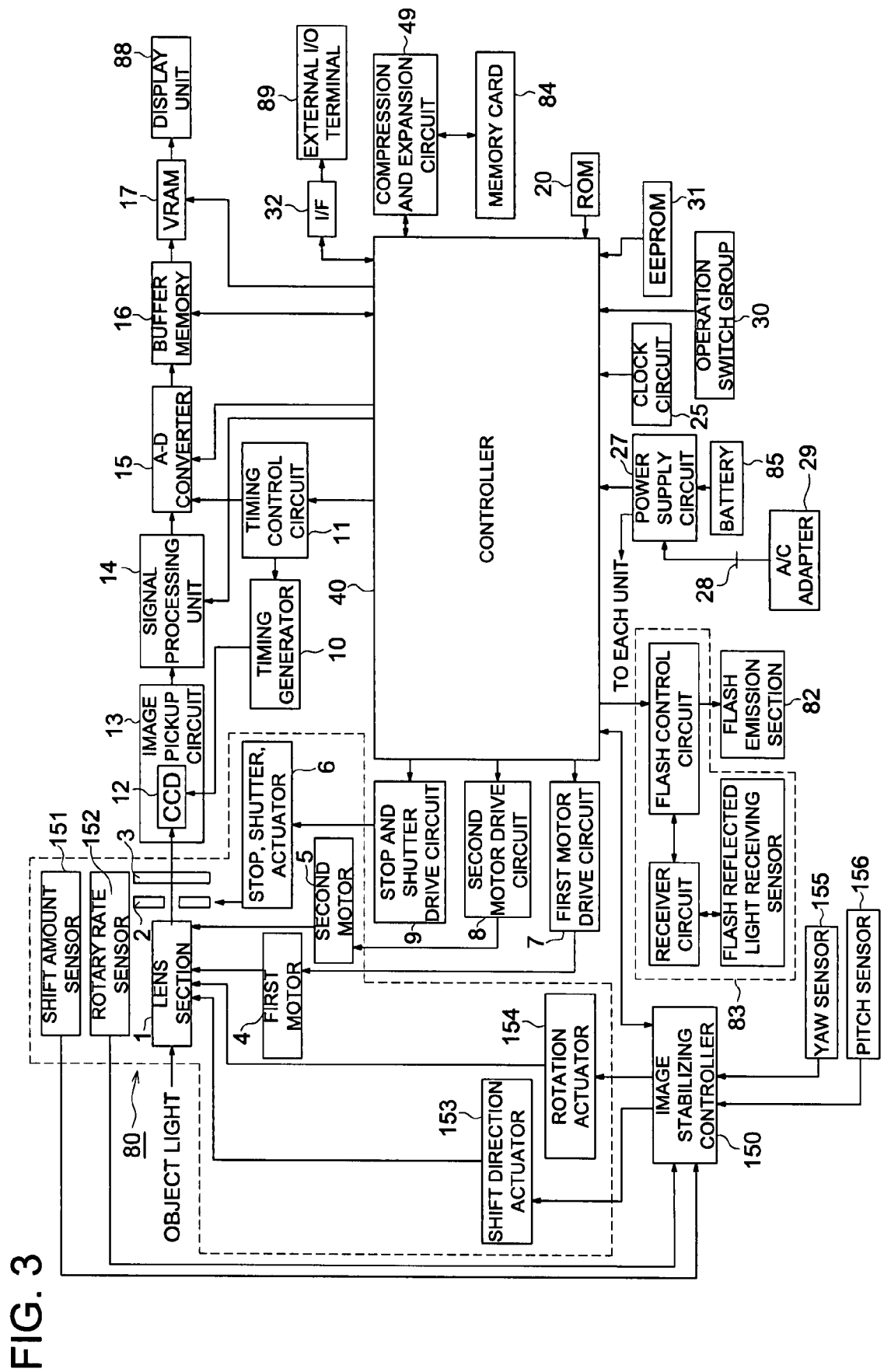
FIG. 3 is a schematic block diagram showing an example of the functional constitution of the camera relating to this embodiment.

FIG. 3 is a schematic block diagram showing an example of the functional constitution of the camera 100 relating to this embodiment. A CCD (charge coupled device) image sensor and a CMOS (complementary metal-oxide semiconductor) image sensor can be utilized as an image pickup element. This example will be described with utilizing the CCD image sensor as an image pickup element.

As shown in FIG. 3, the functional constitution of the camera includes a controller 40 (hereinafter, may be referred also to as a CPU) for controlling each unit of the camera, and an image stabilization controller 150.

The functional constitution further includes a yaw sensor 155 for detecting a shake of the yaw direction shown in FIG.

1 and a pitch sensor 156 for detecting a shake of the pitch direction shown in FIG. 1. The outputs from the two sensors are inputted to the image stabilization controller 150 at predetermined timing.

The lens unit 80 includes a lens section 1 composed of the first lens group 111 to the fourth lens group 114 shown in FIG. 2, the stop shutter unit 2, an optical filter 3 composed of an infrared ray cut filter and an optical low-pass filter which are layered, the first motor 4, the second motor 5, a stop and shutter actuator 6, a shift amount sensor 151, a rotation amount sensor 152, a shift direction actuator 153, and a rotation actuator 154.

The image stabilization controller 150 moves the third lens group 113 by driving the shift direction actuator 153 and rotation actuator 154 according to information inputted from the yaw sensor 155 and pitch sensor 156, and performs the feedback control by the real-time lens moving information from the shift amount sensor 151 and rotation amount sensor 152.

The first motor 4, second motor 5, and stop and shutter actuator 6 are driven via a first motor drive circuit 7, a second motor drive circuit 8, and a stop and shutter drive circuit 9 respectively which are controlled by control signals from the CPU 40.

A timing generator 10 generates a drive control signal of a CCD 12 on the basis of a clock sent from a timing control circuit 11. For example, the timing generator generates timing signals of start and end of storing charge of the CCD 12 and clock signals such as reading control signals (a horizontal synchronizing signal, a vertical synchronizing signal, a transfer signal) of the charge storage amount of each pixel and outputs them to the CCD 12. In an image pickup circuit 13, object light is converted photoelectrically by the CCD 12, and for example, when the CCD uses a primary color filter, an image analog signal of each color component of R (red), G (green), and B (blue) is outputted to a signal processing unit 14.

The signal processing unit 14 performs the signal process for the image analog signals outputted from the image pickup circuit 13. The signal processing unit 14 executes noise reduction and gain adjustment for the image analog signals by correlative double sampling (CDS) and auto-gain control (AGC) and outputs the results to an A-D converter 15.

The A-D converter 15, on the basis of an A-D conversion clock from the timing control circuit 11, converts the input image analog signals from analog to digital to digital signals (hereinafter, referred to as pixel data). Next, the A-D converter 15 stores the pixel data in a buffer memory 16 and then sends it to the CPU 40, and the CPU 40 executes black level correction for the pixel data and then executes white balance (WB) adjustment, γ correction, and YCbCr conversion.

A VRAM 17 is a buffer memory of an image to be displayed on the display unit 88, which has at least a storage capacity of a value or more obtained by multiplying of the number of pixels of a display unit 90 and the number of bits necessary to display. The VRAM stores display image data generated by the CPU 40 which will be described later. As a display unit 88, for example, a display unit such as an LCD or an organic EL is used. According to the display unit to be used, there is installed a D-A converter for converting the pixel data from digital to analog, at a position between the VRAM 17 and the display unit 88.

At time of flaming during imaging, the above structure allows that the pixel data picked up at a predetermined time interval is stored in the buffer memory 16, then, the data is transferred to the VRAM 17, and is displayed on the display unit 88. Thus, the object image can be confirmed. Therefore, it can be used as a finder (referred to as a through-image display or a preview image display).

The above structure further allows reproduction of an picked-up image, by transferring the picked-up image data recorded in a memory card 84 which is a removable image recording medium to a compression and expansion circuit 49, transferring the data to the VRAM 17 after performance of a predetermined signal process at the CPU 40, and displaying the data on the display unit 88.

An interface 32 transmits or receives a signal to or from an external personal computer or printer and communicates with the external personal computer or printer via an external I/O terminal (for example, a USB terminal) 89.

A flash unit 83 is a circuit for controlling flash emission of a flash emission section 82. The flash control circuit is controlled by the CPU 40, controls existence of flash emission, flash emission timing, and charging of the flash emission capacitor, and on the basis of a light emission stop signal inputted from the receiver circuit connected to the flash reflected light receiving sensor, stops flash emission.

A clock circuit 25 manages the imaging date and time. Although the clock circuit may be operated upon receipt of power supply from a power supply circuit 27 for supplying power to each unit, it is preferable that the clock circuit 25 is operated by another power source, which is not drawn.

The power supply circuit 27 supplies power to the CPU 40 and each unit. The power to the power supply circuit 27 is supplied from a battery 85 or from an A/C adapter 29 via a DC input terminal 28.

An operation switch group (hereinafter, may be referred also to as an operation SW group) 30 is, for example, a switch group including a switch group for turning on or off various operation buttons such as a main switch, a release button, a zoom button, a menu button, a set button, and a selection button and a main dial. An ON/OFF signal of the operation SW group 30 is sent to the CPU 40. The CPU 40 controls the operation of each unit according to the operation switch turned on.

An EEPROM 31 is a nonvolatile memory and is used to store individually different characteristic values of the camera. The individually different characteristic values are, for example, information on the infinite position of the focusing lens at each focal distance of the lens unit 80 and are written at the manufacturing step. The CPU 40 reads the individually different characteristic values of the camera from the EEPROM 31 when necessary, to use them to control each unit.

The CPU 40 not only transfers or receives data and controls the timing of each unit but also performs various functions, on the basis of the software stored in a ROM 20. For example, the CPU 40 provides operations such as deciding the exposure conditions of the stop value and shutter speed at time of imaging and recording (the AE preparation operation), and controlling the focus adjustment (the AF operation) performed as the followings. The focusing lens is moved little by little and image data is generated from pixel data obtained each time. The image data is evaluated it on the basis of the image data and an optimum focusing lens position is decided.

The aforementioned is the internal block constitution of the camera 100 relating to this embodiment. Hereinafter, a concrete example of movement of the third lens group 113 for image stabilization relating to this embodiment will be explained.

Figure 4:
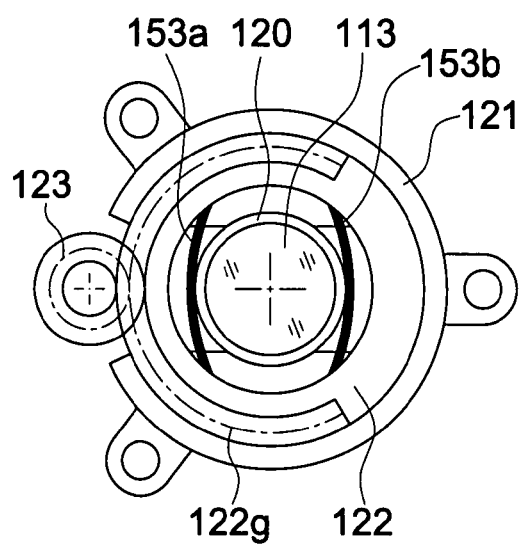
FIGS. 4(a), 4(b), and 4(c) are drawings showing an example of the schematic structure around the third lens group moving during image stabilization and the operation status.
Figure 4:
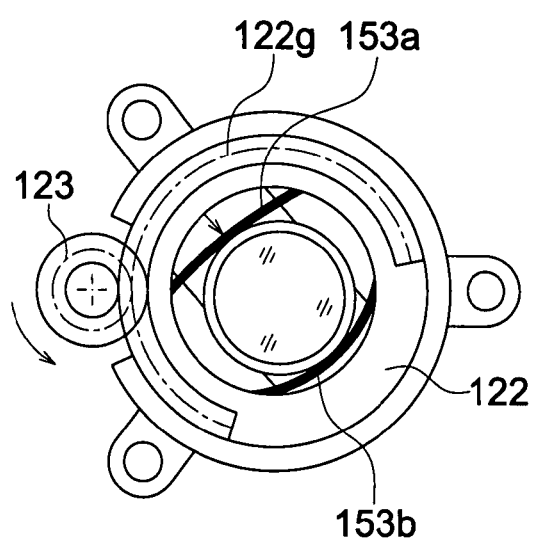
Figure 4:
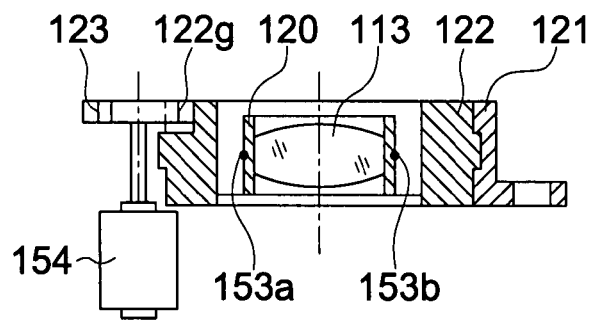

FIGS. 4(*a*), 4(*b*), and 4(*c*) are drawings showing an example of the schematic structure around the third lens group 113 which moves during image stabilization, and the operation status of the structure. FIG. 4(*a*) shows a front view and FIG. 4(b) shows a cross sectional view. Further, FIG. 4(c) shows an example of the operation status of the third lens group 113 during the image stabilization operation.

As shown in FIGS. 4(a) and 4(b), the third lens group 113 is held by a third lens group frame 120. The third lens group frame 120 is held between shape memory alloys 153a and 153b. Furthermore, the shape memory alloys 153a and 153b are supported by a rotation frame 122 and enable to be supplied with electricity from a power circuit, which is not drawn. The rotation frame 122 is supported rotatably in a support frame 121. The support frame 121 is fixed to the fixed lens barrel 135 or 143 shown in FIG. 2.

On the outer periphery of the rotation frame 122, a gear section 122g is formed and a drive gear 123 is meshed with the gear section 122g. The drive gear 123 is driven to rotate by the motor 154. For example, a stepping motor is used for the motor 154.

By rotation drive of the motor 154, the rotation frame 122 rotates with holding the shape memory alloys 153a and 153b and the third lens group frame 120 which holds the third lens group 113, through the drive gear 123 and gear section 122g. Furthermore, one of the shape memory alloys 153a and 153b is supplied with electricity from the power circuit, which is not drawn, and is contracted due to generated heat. Thereby, in the state shown in FIG. 4(a), the third lens group frame 120 shifts in the transverse direction of the sheet of paper.

In this embodiment, the motor 154 is equivalent to the rotation actuator 154 shown in FIG. 3 and the shape memory alloys 153a and 153b are equivalent to the shift direction actuator 153 shown in FIG. 3.

Namely, as shown in FIG. 4(c), rotation of the drive gear 123 rotates the rotation frame 122 to rotate the shape memory alloys 153a and 153b. Thereby, the shift direction of the third lens group 113 is rotated around the optical axis, thus the shift direction is changed. Furthermore, by contraction of one of the shape memory alloys 153a and 153b (FIGS. 4(a) to 4(c) illustrate contraction of 153a), the third lens group 113 shifts in a predetermined direction in the plane perpendicular to the optical axis.

Figure 5:
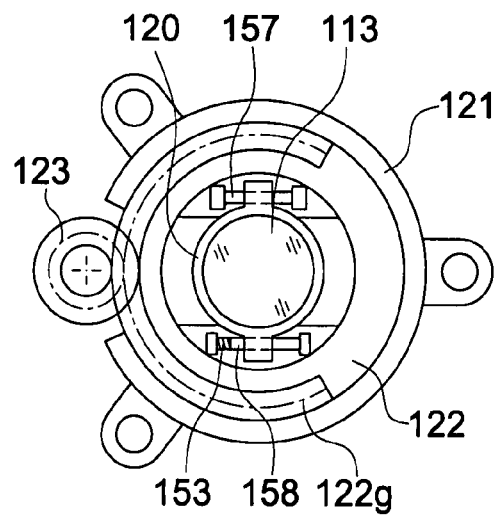
FIGS. 5(a), 5(b), and 5(c) are drawings showing another example of the schematic structure around the third lens group moving during image stabilization and the operation status.
Figure 5:
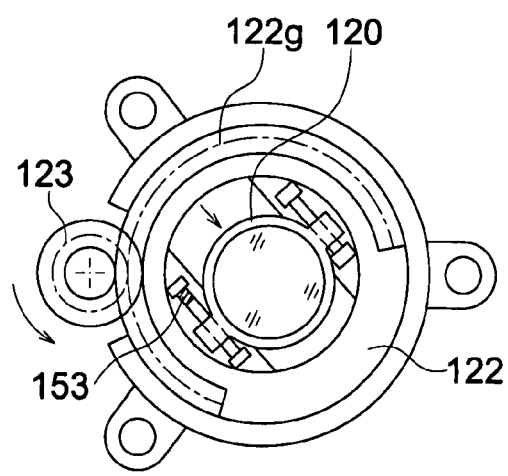
Figure 5:
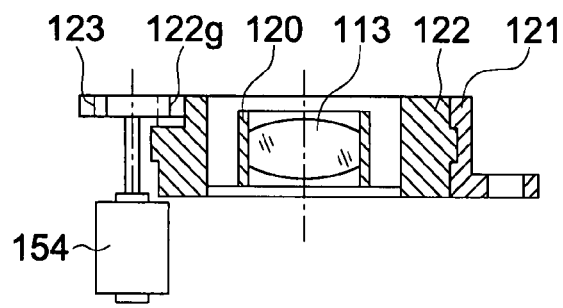

FIGS. 5(a), 5(b), and 5(c) are drawings showing another example of the schematic structure around the third lens group 113 moving during image stabilization and the operation status. FIG. 5(a) shows a front view and FIG. 5(b) shows a cross sectional view. Further, FIG. 5(c) shows an example of the operation status of the third lens group 113 during the image stabilization operation. Further, in FIGS. 5(a), 5(b), and 5(c), to avoid duplication of explanation, to the same functional members, the same numerals are assigned and only the different parts from those of FIGS. 4(a), 4(b), and 4(c) will be explained.

In the state shown in FIG. 4(a), a guide shaft 157 and a guide shaft 158 connected to a piezoelectric element 153 pass through and support the third lens group frame 120, so that the third lens group frame can shift in the transverse direction of the sheet of paper. The third lens group frame 120 and guide shaft 158 are structured so as to be kept in the static status by predetermined frictional force between them.

The piezoelectric element 153 is composed of laminated piezoelectric ceramics and functions as an electric actuator for performing the expansion and contraction operation in the axial direction (shift direction) of the guide shaft 158 by impression of a voltage. The guide shaft 158 is vibrated in correspondence with the expansion and contraction operation of the piezoelectric element 153. By this vibration, the third lens group frame 120 holding the third lens group 113 is moved in the shift direction along the guide shafts 158 and 157. Further, the rotation frame 122, support frame 121, drive gear 123, and motor 154 are the same as those shown in FIGS. 4(a), 4(b), and 4(c).

Namely, as shown in FIG. 5(c), rotation of the drive gear 123 rotates the rotation frame 122 to rotate the shift mechanism including the piezoelectric element. Thereby, the shift direction of the third lens group frame 120 is rotated around the optical axis, thus the shift direction is changed. Furthermore, by expansion and contraction of the piezoelectric element 153, the third lens group frame 120 shifts in a predetermined direction in the plane perpendicular to the optical axis.

In this embodiment, the motor 154 is equivalent to the rotation actuator 154 shown in FIG. 3 and the piezoelectric element 153 is equivalent to the shift direction actuator 153 shown in FIG. 3.

Figure 6:
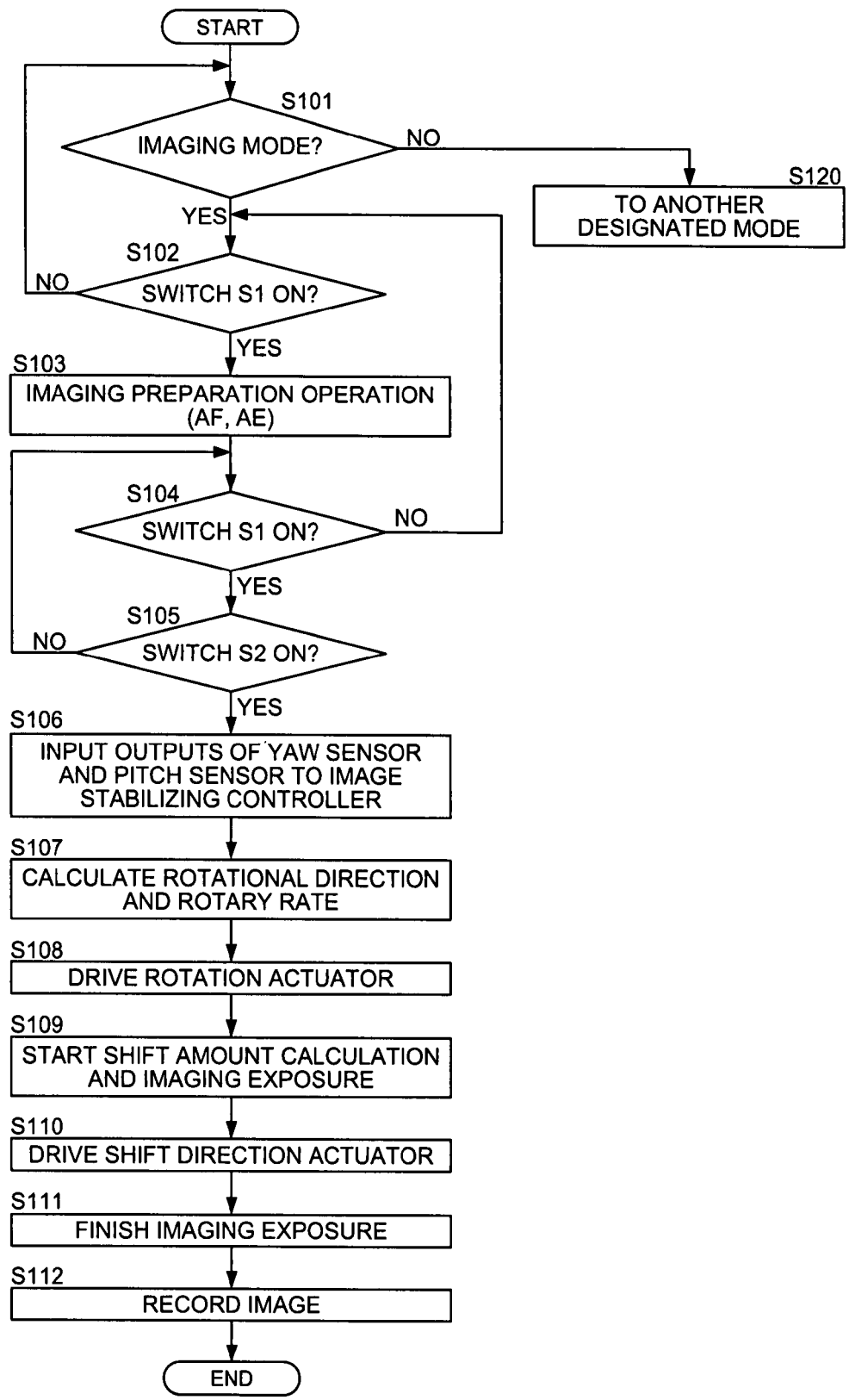
FIG. 6 is a flow chart showing the schematic operation of the camera during imaging including the lens unit having the image stabilizing apparatus shown in FIGS. 4(a) to 4(c) and FIGS. 5(a) to 5(c)

FIG. 6 is a flow chart showing the schematic operation of the camera during imaging including the lens unit having the image stabilizing apparatus shown in FIGS. 4(a) to 4(c) and FIGS. 5(a) to 5(c). Hereinafter, the operation will be explained according to the flow.

In the state that the main power source of the camera is turned on, firstly, the camera judges whether the imaging mode is set or not (Step S101). When the imaging mode is not set (No at Step S101), the camera moves to another designated mode (Step S120).

When the imaging mode is set (Yes at Step S101), the camera waits for pressing the first stage of the release button, that is, turning on the switch S1 (Step S102). When the switch S1 is not turned on (No at Step S102), the camera returns to Step S101 and repeats Steps S101 and S102.

When the switch S1 is turned on (Yes at Step S102), the imaging preparation operation is performed (Step S103). The imaging preparation operation means the focusing operation and beam measuring operation. When the imaging preparation operation is finished, the camera judges again whether the switch S1 is turned on or not (Step S104). When the switch S1 is not turned on at Step S104 (No at Step S104), the camera returns to Step S102.

When the switch S1 is turned on at Step S104 (Yes at Step S104), the camera judges whether the second stage of the release button is pressed, that is, the switch S2 is turned on or not (Step S105). When the switch S2 is not turned on (No at Step S105), the camera returns to Step S104.

When the switch S2 is turned on (Yes at Step S105), the outputs of the yaw sensor 155 and pitch sensor 156 are inputted to the image stabilization controller 150 (Step S106). The image stabilization controller 150, in correspondence to the input data of shaking, calculates the rotational direction and rotary rate of the rotation frame 122 in order to make the shift direction and shaking direction coincide with each other (Step S107).

Then, the image stabilization controller 150 drives the rotation actuator 154 (in FIGS. 4(a) to 4(c) and FIGS. 5(a) to 5(c), the motor 154) on the basis of the rotational direction and rotary rate of the rotation frame 122 which are calculated (Step S108). Furthermore, the image stabilization controller 150 calculates the shift amount corresponding to the input shake amount, while the imaging exposure is started (Step S109). Furthermore, at the almost same time of the exposure start, the image stabilization controller 150 starts to drive the shift direction actuator 153 to stabilize an image. The shift direction actuator 153 is the shape memory alloy 153a in FIGS. 4(a) to 4(c) and is the piezoelectric element 153 in FIGS. 5(a) to 5(c). The shift-movement is executed continuously during exposure. Namely, the image stabilization controller 150 controls successively the shift direction actuator 153 on the basis of input data from the shift amount sensor 151, yaw sensor 155, and pitch sensor 156 which detect the shift amount of the third lens group frame 113.

When the exposure time decided by the beam measuring operation performed at Step S103 has elapsed, the image stabilization controller 150 closes the shutter and the imaging exposure is finished (Step S111). Hereafter, the obtained image data is subject to a predetermined process, and the image is recorded in the memory card 84 which is a storage means (Step S112), and the imaging of one frame is finished.

The aforementioned is the schematic operation of the camera at time of imaging including the lens unit having the image stabilizing apparatus shown in FIGS. 4(a) to 4(c) and FIGS. 5(a) to 5(c).

Figure 7:
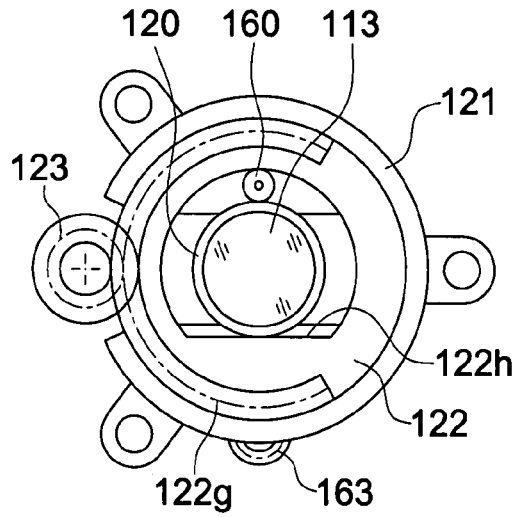
FIGS. 7(a), 7(b), 7(c), and 7(d) are drawings showing still another example of the schematic structure around the third lens group moving during image stabilization and the operation status.
Figure 7:
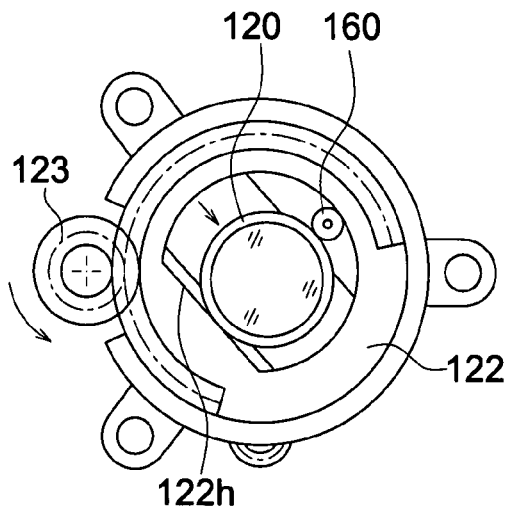
Figure 7:
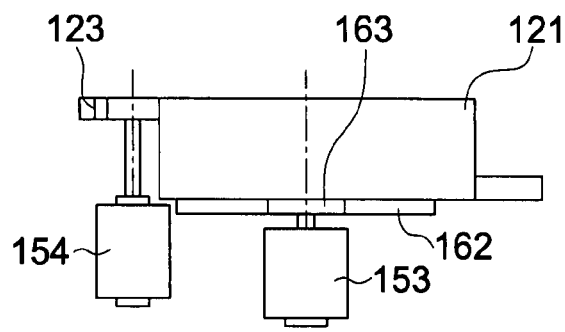
Figure 7:
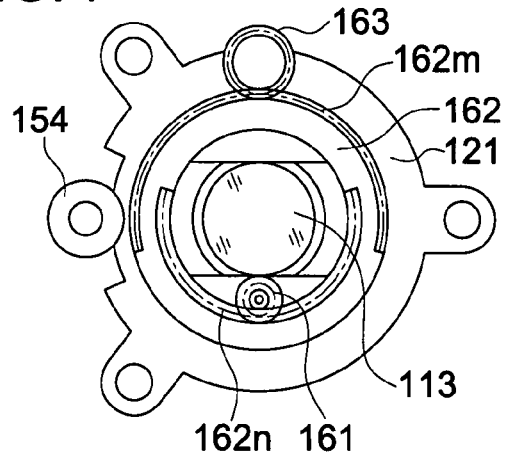

FIG. 7 shows drawings showing still another example of the schematic structure around the third lens group 113 moving during image stabilization and the operation status. FIG. 7(a) is a front view, and FIG. 7(b) is a side view, and FIG. 7(c) is a rear view. Further, FIG. 7(d) shows an example of the operation status of the third lens group 113 at time of image stabilization. Further, in FIGS. 7(a) to 7(d), to avoid duplication of explanation, to the same functional members, the same numerals are assigned and only the different parts from those of FIG. 4 will be explained.

The third lens group frame 120 holding the third lens group 113 is held between a wall surface 122h formed on the rotation frame 122 and a soft roller 160 which is soft and deformable. The third lens group frame, in the state shown in FIG. 7(a), can be shifted in the transverse direction of the sheet of paper by rotation of the soft roller 160. The shaft of the soft roller 160 passes through the rotation frame 122 and is connected to a pinion gear 161. A ring gear 162 is composed of an inner gear portion 162n and an outer gear portion 162m. The inner gear portion 162n and the pinion gear 161 are meshed with each other, and the outer gear portion 162m is meshed with a shift drive gear 163. The shift drive gear 163 is driven by the motor 153.

Namely, rotation of the motor 153 rotates the shift drive gear 163, and the pinion gear 161 and soft roller 160 are rotated via the ring gear 162 meshed with the shift drive gear. Then, the third lens group frame 120 holding the third lens group 113 is rolled along the wall surface 122h of the rotation frame 122, to be shifted. The rotation frame 122, support frame 121, drive gear 123, and motor 154 are the same as those shown in FIGS. 4(a) to 4(c).

Namely, as shown in FIG. 7(d), rotation of the drive gear 123 rotates the rotation frame 122 to rotate the shift mechanism including the motor 153. Thereby, the shift direction of the third lens group frame 120 is rotated around the optical axis, thus the shift direction is changed. Furthermore, by rotation of the motor 153, the soft roller 160 is rotated and the third lens group 113 is rolled on the wall surface 122h to shift in a predetermined direction in the plane perpendicular to the optical axis.

In this embodiment, the motor 154 is equivalent to the rotation actuator 154 shown in FIG. 3 and the motor 153 is equivalent to the shift direction actuator 153 shown in FIG. 3.

Figure 8:
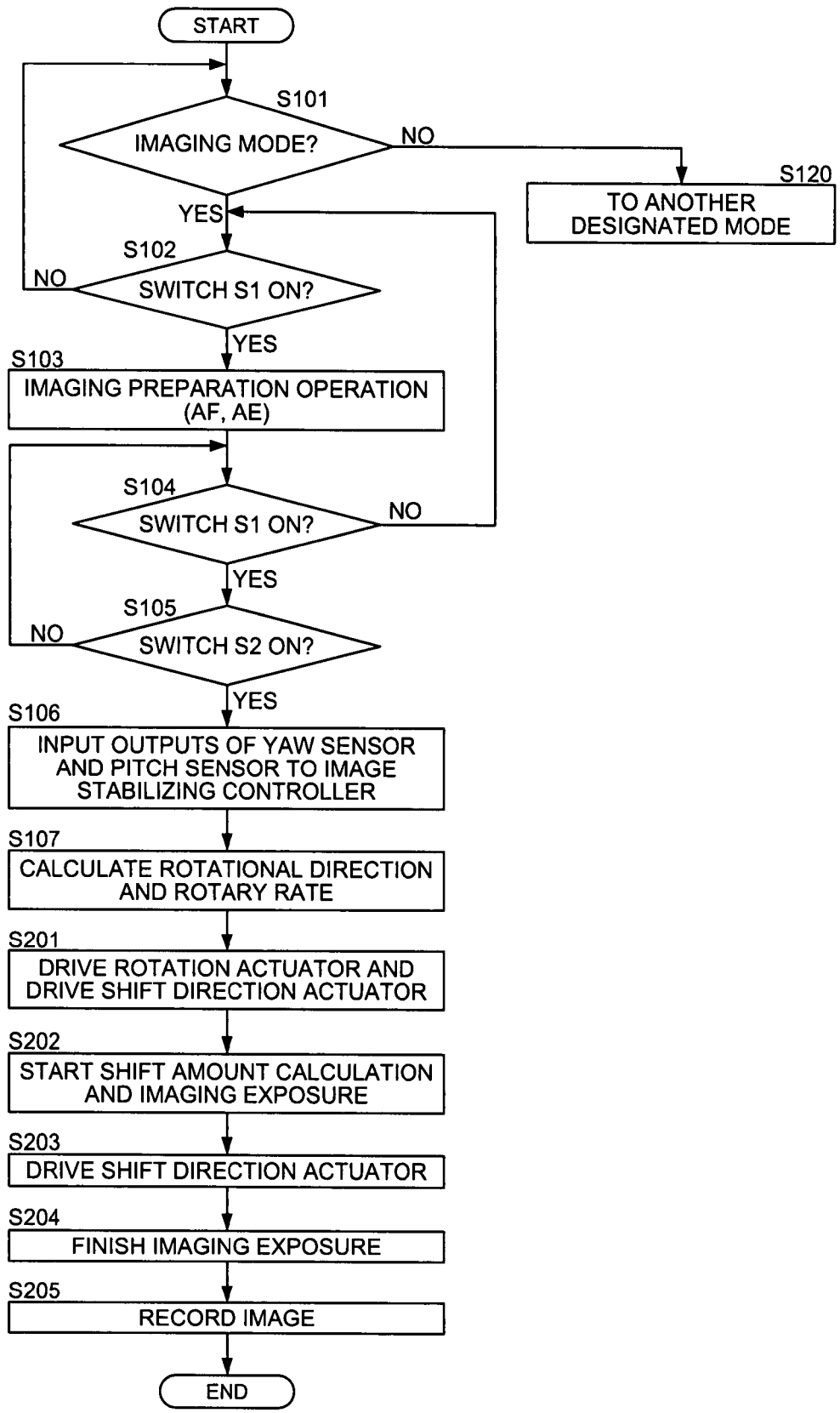
FIG. 8 is a flow chart showing the schematic operation of the camera during imaging including the lens unit having the image stabilizing apparatus shown in FIG. 7.

FIG. 8 is a flow chart showing the schematic operation of the camera during imaging including the lens unit having the image stabilizing apparatus shown in FIGS. 7(a) to 7(c). Hereinafter, the operation will be explained according to the flow. Further, Steps S101 to S107 shown in FIG. 8 are the same as those of the flow shown in FIG. 6 and Yes at Step S105 in the middle of the steps and the subsequent steps will be explained.

When the switch S2 is turned on (Yes at Step S105), the outputs of the yaw sensor 155 and pitch sensor 156 are inputted to the image stabilization controller 150 (Step S106). The image stabilization controller 150, in correspondence to the input data of shaking, calculates the rotational direction and rotary rate of the rotation frame 122 in order to make the shift-moving direction and shaking direction coincide with each other (Step S107).

Then, the image stabilization controller 150 drives the rotation actuator 154 (in FIGS. 7(a) to 7(c), the motor 154) on the basis of the rotational direction and rotary rate of the rotation frame 122 which are calculated.

At this time, the image stabilization controller 150 drives the shift direction actuator 153 (in FIGS. 7(a) to 7(c), the motor 153) and rotates the ring gear 162 at the same angle as the rotational angle of the rotation frame 122 (Step S201). The reason is to prevent it from occurring that when the ring gear 162 is stopped, the pinion gear 161 supported by the rotation frame 122 rotates, thus that the third lens group frame 120 is shifted with rolling along the wall surface 122h. Namely, to keep the soft roller 160 in the static state, the ring gear 162 is rotated in the same direction at the same angle as the rotational angle of the rotation frame 122.

Then, the image stabilization controller 150 calculates the shift amount corresponding to the input shake amount, while the imaging exposure is started (Step S202). Furthermore, at the almost same time of the exposure start, the image stabilization controller 150 starts to drive the shift direction actuator 153 (in FIG. 7, the motor 153) to stabilize an image (Step S203). The shift-movement is executed continuously during exposure. Namely, the image stabilization controller 150 controls successively the shift direction actuator 153 on the basis of input data from the shift amount sensor 151, yaw sensor 155, and pitch sensor 156 for detecting the shift amount of the third lens group frame 113.

When the exposure time decided by the beam measuring operation performed at Step S103 has elapsed, the image stabilization controller 150 closes the shutter and the imaging exposure is finished (Step S204). Hereafter, the obtained image data is subject to a predetermined process, and the image is recorded in the memory card 84 which is a storage means (Step S205), and the imaging of one frame is finished.

The aforementioned is the schematic operation of the camera at time of imaging including the lens unit having the image stabilizing apparatus shown in FIGS. 7(a) to 7(c).

Further, the flows shown in FIGS. 6 and 8 are explained by the example that the shift direction actuator is started to be driven to stabilizing an image almost simultaneously with start of the image exposure. Though, the imaging exposure may be started after the shift direction actuator is started to be driven.

As explained above, the image stabilizing apparatus includes the shift mechanism for shifting the predetermined lens group in the predetermined direction and the rotation mechanism for rotating the shift mechanism in the plane perpendicular to the optical axis. This structure performs the image stabilization by shifting the predetermined lens group in the predetermined direction perpendicular to the optical axis and by rotating the shift direction in the plane perpendicular to the optical axis. Thus, it provides an image stabilizing apparatus at a low cost in which there is no need to move the lens frame integrally with one of the moving mechanisms and the lens group is driven by a simple mechanism.

Furthermore, an actuator using a shape memory alloy or a piezoelectric element is adopted for the moving mechanism for the lens group, thus the moving mechanism itself can be made smaller. Further, by use of the shape memory alloy or rolling the lenses by the soft roller for the shift-movement, the guide shaft becomes unnecessary and the moving mechanism itself can be simplified and miniaturized.

Further, the lens unit has the aforementioned image stabilizing apparatus, so that a small lens unit can be obtained at a low cost. Similarly, the image pickup apparatus has the aforementioned lens unit, so that a small image pickup apparatus can be obtained at a low cost.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

For example, the image stabilizing apparatus relating to this embodiment is explained using the lens unit of the folded optical system having a reflective surface, though the present invention is not limited to it, and needless to say, the present invention can be applied to a lens unit of an ordinary optical system having no reflective surface.

What is claimed is:

1. An image stabilizing apparatus for stabilizing an image by moving a predetermined lens group in a plane perpendicular to an optical axis in an image pickup optical system which transmits a light flux from an object, the image stabilizing apparatus comprising:

a shift mechanism for shifting the predetermined lens group in a predetermined shifting direction; and a rotation mechanism for rotating the shift mechanism in the plane perpendicular to and about the optical axis.

2. The image stabilizing apparatus of claim 1, wherein the shift mechanism comprises an actuator, and the actuator comprises a shape memory alloy whose length changes due to an electricity applied to the actuator.

3. The image stabilizing apparatus of claim 1, wherein the shift mechanism comprises an actuator, and the actuator comprises a piezoelectric element whose length changes due to an electricity applied to the actuator.

4. The image stabilizing apparatus of claim 1, wherein the shift mechanism shifts the lens group in the predetermined direction by rolling the lens group in the plane perpendicular to the optical axis.

5. A lens unit comprising: the image stabilizing apparatus of claim 1.

6. An image pickup apparatus comprising: the lens unit of claim 5.

7. The image stabilizing apparatus of claim 1, wherein the rotation mechanism rotates the predetermined shift direction of the predetermined lens group around the optical axis in the plane perpendicular to the optical axis.

* * * * *